Figure 1:
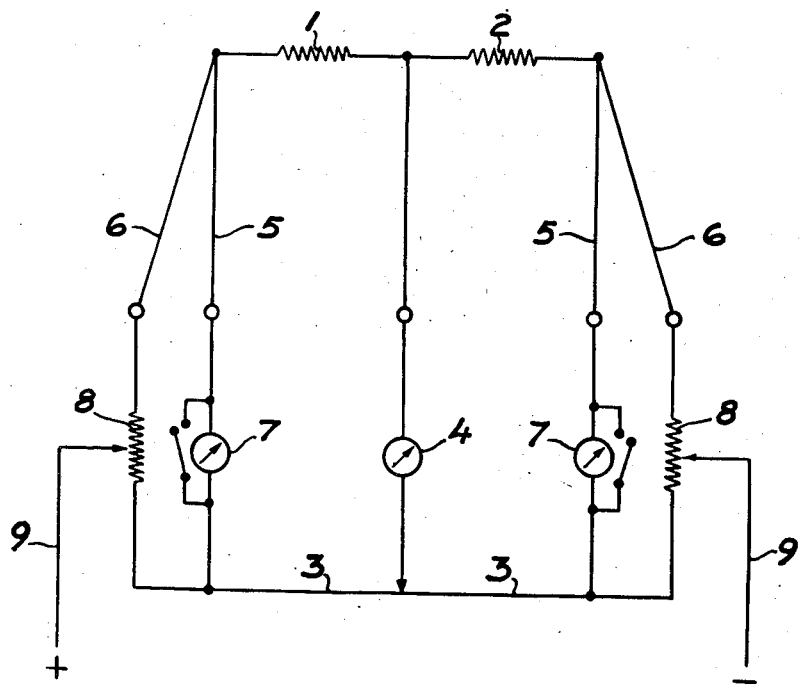

Aug. 11, 1953 G. V. A. GUSTAFSSON 2,648,819
DEVICE FOR MEASURING RESISTANCE CHANGES
Filed Nov. 14, 1951 4 Sheets-Sheet 1

Inventor
G. V. A. Gustafsson

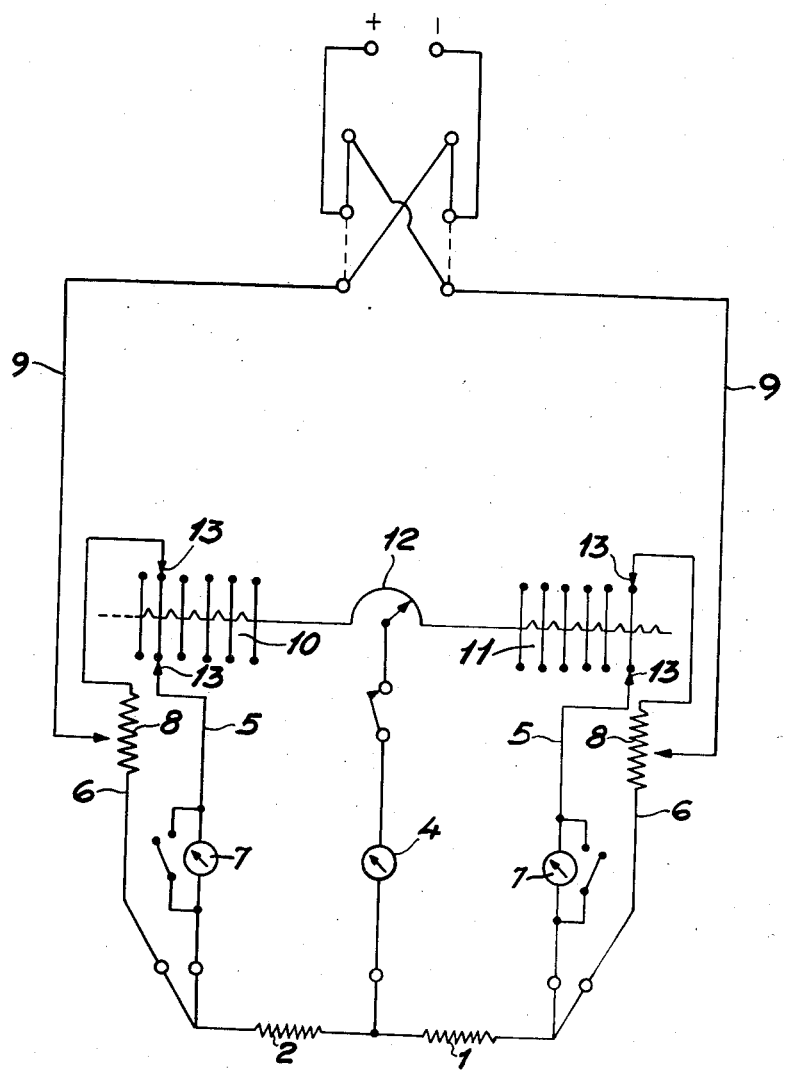

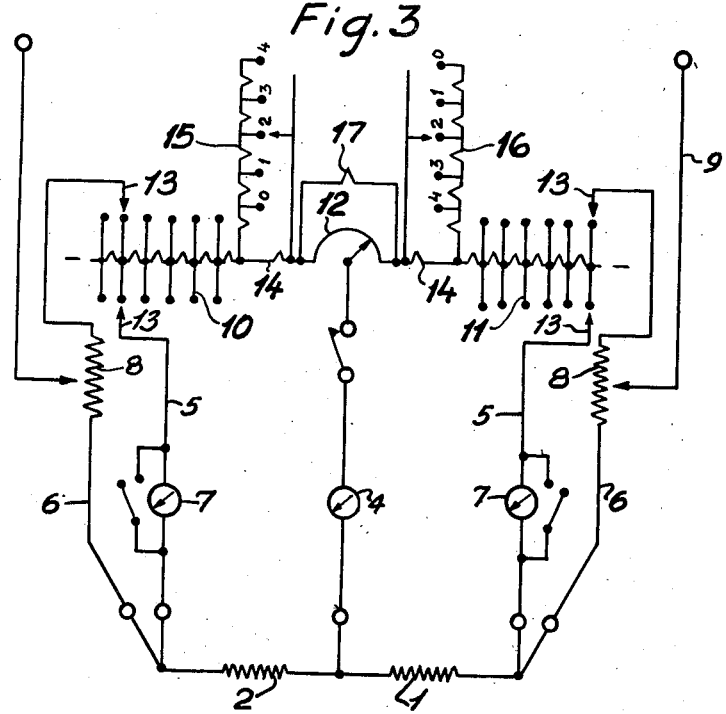
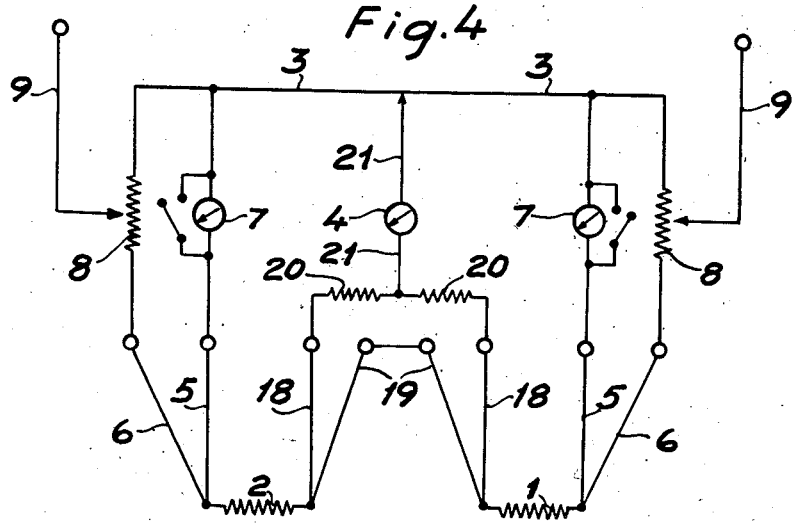

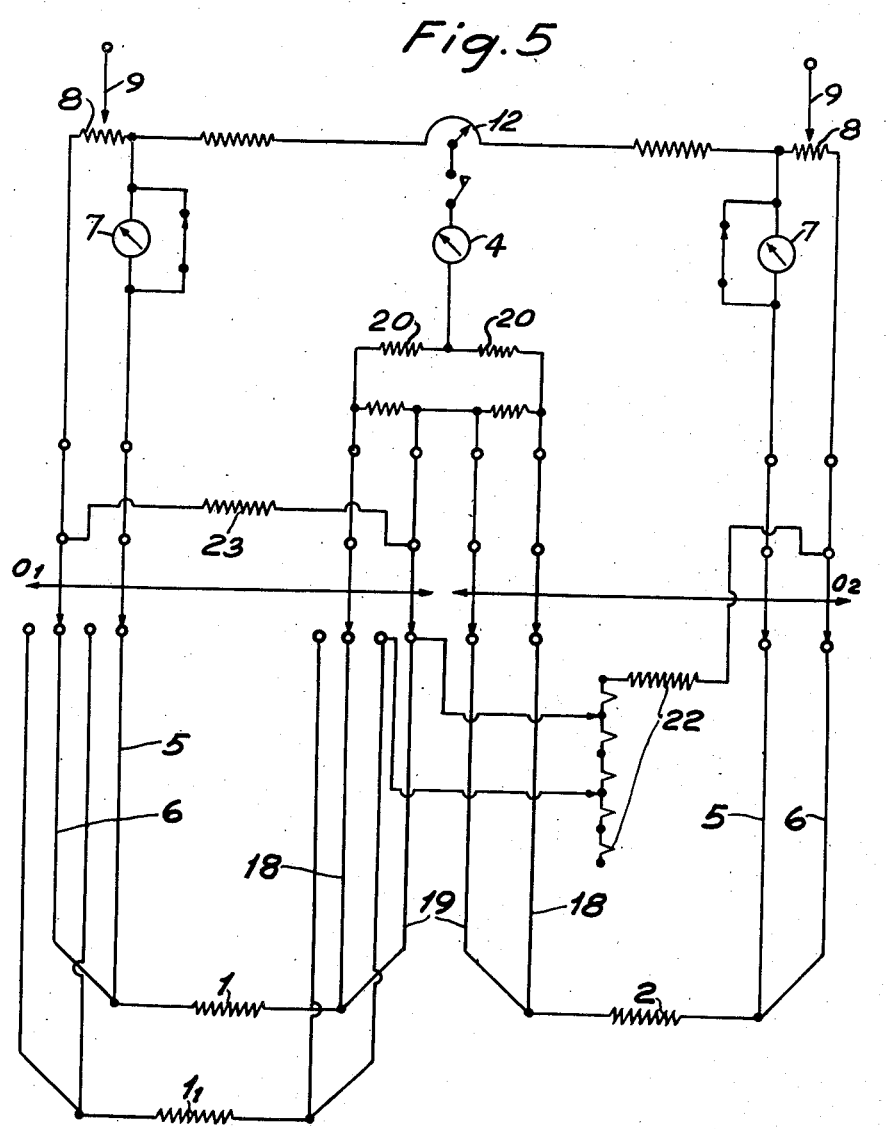

UNITED STATES PATENT OFFICE 2,648,819

DEVICE FOR MEASURING RESISTANCE CHANGES

Gotthard V. A. Gustafsson, Bromma, Sweden

Application November 14, 1951, Serial No. 256,222
In Sweden November 24, 1950

10 Claims. (Cl. 324—62)

The present invention relates to a device for accurately measuring small resistance changes by means of a bridge circuit.

When measuring strains by resistance changes in strain gauges some type of Wheatstone bridge is generally used. This will serve the purpose in cases where the supply wires between the gauge and the measuring box are short and when only a single measuring point is to be measured. Difficulties will arise, however, when the supply wires are long or when several measuring points are to be measured with the same measuring box and change-over switches accordingly must be provided in the supply wires. When measuring with strain gauges an accuracy of about $10^{-6}$ as to strain is generally desired which corresponds to an accuracy as to the relative resistance $$\left(\frac{\Delta R}{R}\right)$$

of about $2 \cdot 10^{-6}$. As the resistance R of the gauge is mostly of the order of 100 ohm, an accuracy of measurement of the resistance changes $\Delta R$ of about $10^{-4}$ ohm is desired. As in a Wheatstone bridge the resistances of the change-over switches and the supply wires are in series with the resistances of the gauges, the variations in the former resistances must be less than $10^{-4}$ ohm which is very difficult to bring about.

In order to avoid these difficulties the measuring bridge ought to be connected in such a manner that the wires and the change-over switches between the gauge or gauges and the ratio arms of the measuring box are carrying only small currents, whereby the varying resistance changes therein do not result in any significant voltage deviation. In order to obtain such a currentfree lead between the gauge and the measuring box, double wires arranged in a certain manner may be used, one of the said wires carrying current and the other one being almost currentfree. It is already known, for instance in a Thompson bridge to have double wires to the resistances which shall be compared in order to compensate the resistances of the supply wires and the transition resistances. This method has the disadvantage that a certain wire in the bridge must be broken and closed several times so that the final setting for measuring can be successively approached.

A measuring device according to the invention is substantially characterized in that the outer ends of the two ratio arms of the Wheatstone bridge are connected with the outer ends of the series-coupled resistors by means of double wires. A current meter can be connected into one of the wires and the other one is provided with a potentiometer resistor with a sliding contact. A wire to the current supply can be connected to the sliding contact. Said contact can be set in such a manner that the current meter in the second wire indicates zero. Then the current meter is short-circuited before measuring the resistance.

The invention will be described more in detail below with reference to the accompanying circuit diagrams for various embodiments of the invention, shown in Figs. 1 to 5 of the drawing, all of which are schematic views showing respective wiring diagrams of such embodiments.

In a Wheatstone bridge as shown in Fig. 1 two series-connected resistors (1 and 2) are included, one or both of which can be a strain gauge. The resistors are placed near each other so that the connection between them is comparatively short but they are placed rather far from the remaining part of the bridge which is placed in a measuring box, that is, the arms 3 of the measuring wire and the zero setting instrument 4. The other ends of the series-connected resistors 1 and 2 are connected to the ends of the measuring arms 3 by double wires 5 and 6. The wire 5 is provided with a current meter 7 and the other wire 6 with a potentiometer resistor 8 having a sliding contact. A wire 9 from the current supply is connected to said sliding contact. D. C. or A. C. may be used. When using D. C., two batteries may be used and when using A. C. two different secondary windings of a transformer may be used. The sliding contact can be set in such a manner that the current meter indicates zero. Then the potential in the end of one of the resistors 1 or 2 will equal the potential in the corresponding end of the ratio arms 3. Thus the result of the measurement will be independent of the length and the resistance of the wires 5 and 6. The current meter 7 is short-circuited before the resistance measuring takes place.

In Fig. 2, the bridge arms of the measuring bridge include resistors 10 and 11 on each side of the adjustable potentiometer 12. The double wires 5 and 6 are connected to said resistors 10, 11 by means of movable double switches 13. The double switches of each resistor 10 and 11 are mechanically connected so that, when the two double switches are moved stepwise, the resistance cut in on one side of the potentiometer equals that cut out on the other side. The resistances of the series-connected partial resistors of the resistors 10, 11 ought to be of the same magnitude and as great as the resistance which corresponds to the measuring range of the potentiometer. By this arrangement the available range for accurate measuring of resistance changes can be increased so as to comprise a large difference in the resistance of the resistors 1 and 2, the measuring accuracy being maintained.

Fixed resistors 14 connected between the side resistors 10 and 11 and the potentiometer 12 are shown in Fig. 3. Over these there are shunted stepwise variable resistors 15 and 16 in which each step corresponds to ten steps in the resistors 10 and 11. The operating members for the shunt resistors 15 and 16 are mechanically connected in such a manner that upon a stepwise motion as great a resistance is introduced into one resistance combination 14, 15 as is cut out from the other resistance combination 14, 16. This has the advantage that the measuring range becomes much greater without the measuring accuracy being decreased.

Fig. 3 shows also that the potentiometer 12 can be provided with a shunt resistor 17 making possible an adjustment of the resistance of the potentiometer so that it equals the resistance of the partial resistors in the side resistors 10 and 11. This is important when the potentiometer is worn and its resistance has changed accordingly.

Fig. 4 shows a case in which the resistors 1 and 2 are at a great distance from each other and from the measuring wires 3. Then the connection between the series-connected resistors 1 and 2 is made in the shape of two double wires 18 and 19. One of the conductors 18 in either double wire is connected to two series-connected resistors 20 of equal size between which the wire 21 to the zero setting instrument 4 is connected. Due to the resistors 20 a change in the resistance of the double wires 18 and 19 will practically not influence the result of the measurement.

Fig. 5 shows that a fixed resistor 23 and a variable shunt resistor 22 are connected to the resistors 1 and 2 respectively between the current carrying wires 6 and 19. The variable resistor 22 should be connected over the passive resistor 2. The purpose of this is that the correction of the gauge factor for the shunt resistor shall be equal for all the active gauges (1, 1' etc.) which can be connected to the measuring bridge by the switch $O_1$. The measured resistance change of the combination of gauge 1 and fixed resistor 23 is not equal to the resistance change of gauge alone. This latter resistance change $\Delta R$ is proportional to the gauge factor $g$, as $g$ is equal to the unit resistance change $\Delta R/R$ of the gauge divided by the strain $\epsilon$, i. e., $g = \Delta R/R\epsilon$. In practice the resistances of the active gauges should preferably be compensated from the beginning by being connected to any terminal taps on the resistor 22 so that the initial settings of the measuring box for the various gauges are located near each other. In order to make it possible to choose various resistors 2 a change-over switch $O_2$ may be used in the same way as the switch $O_1$ for the choice of the active gauges.

The purpose of this invention can also be reached by using two current supplies, one of which feeds the resistors 1 and 2 only and the other one feeds the measuring wires 3, the two voltages to be compared being so adjusted that the wire 5 with the current meter 7 becomes currentfree. The resistors 8 then becomes superfluous. When using A. C., the two current supplies should be in phase, which can be obtained by using two secondary windings of a transformer.

The invention also relates to a method of carrying out such measurements, characterized in that the wires 5 are made currentfree by adjusting the sliding contacts to the resistors 8. Then the current meters 7 are short-circuited and the bridge is balanced by setting the potentiometer 12 and, if necessary, moving the side resistors 10, 11, 15 and 16.

Having now described my invention, what I claim as new and desire to secure by Letters Patent is:

1. In a bridge resistance-measuring circuit for strain gauges or the like, a pair of series-connected resistors, at least one of which is a strain gauge resistor, a slide wire resistor having a sliding contact and two fixed end terminals, a zero-reading current measuring instrument connected between said sliding contact and the midpoint of said series-connected resistors, respective pairs of wires connecting the outer terminal of said slide wire resistor, a current measuring instrument connected in one wire of each pair and a potentiometer resistor connected in the other wire of each pair, a sliding contact for each of said potentiometer resistors, a current supply connected across said respective last-named sliding contacts, and means for individually short-circuiting said last-named current measuring instruments.

2. A device constituting two adjacent measuring branches of a four armed bridge coupling for measuring accurately the resistance of a variable gauge resistor, for instance a strain gauge, which together with a fixed gauge resistor or another variable gauge resistor constitute the other two branches of the bridge coupling, characterized in that the outer ends of measuring branches of the bridge are connected with the outer ends of said gauge resistors by means of a pair of wires, a current meter being connected in one of the wires of each pair while the other wire of each pair is provided with a potentiometer resistor with a sliding contact, a wire connecting said contact with a current supply which sliding contact can be set in such a manner that the current meter of the other wire indicates zero after which the meter is preferably short-circuited before measuring the resistance by means of the bridge.

3. A device as claimed in claim 2, characterized in that the connections of the pair of wires to each end of the measuring branches can be stepwise changed-over by movable double switches which are connected to series-connected resistors on each side of the adjustable measuring potentiometer of the bridge, besides which the double contacts on each side of the potentiometer are mechanically connected in such a manner that at the stepwise movement as great a resistance is introduced on one side as it cut out on on the other side.

4. A device as claimed in claim 2, characterized in that the resistance of the stepwise connectable partial resistors in the said series-coupled resistors are of equal size and as great as the resistance corresponding to the measuring range of the potentiometer.

5. A device as claimed in claim 2, characterized in that fixed resistors are connected between the said series-coupled resistors and the measuring potentiometer and that stepwise varying shunt resistors are connected over said fixed resistors, each change of the steps of said shunt resistor corresponding to a change of ten steps in the said series-coupled resistors besides which the operating members of the shunt resistors are mechanically connected in such a manner that upon the stepwise movement as great a resistance is switched on in one of the resistance combinations as is switched off in the other one.

6. A device as claimed in claim 2, characterized in that the measuring potentiometer is shunted with a resistor for adjusting the resistance of this potentiometer so that its measuring range will equal the partial resistances of the said series-coupled resistors.

7. A device as claimed in claim 3, characterized in that the connection between the gauge resistors consists of two pairs of wires one of the wires in each pair being connected to two other series-connected resistors of equal size, between which latter resistors the wire to the zero setting instrument is connected.

8. A device as claimed in claim 3, characterized in that between the current carrying leads a fixed and a variable shunt resistor respectively is connected to the respective gauge resistor said variable resistor being preferably switched over the fixed gauge resistor to make zero setting for the various variable gauge resistors possible.

9. The method of measuring with a bridge circuit of the type defined in claim 1, comprising first adjusting said last-named sliding contacts until the last named current measuring instruments indicate zero current in their respective branches, and thereafter setting said slide wire resistor until said zero-reading instrument indicates bridge balance.

10. The method in accordance with claim 9, in which said last-named current measuring instruments are short-circuited after their corresponding potentiometers have been set, and prior to the setting of said slide-wire resistor.

GOTTHARD V. A. GUSTAFSSON.

References Cited in the file of this patent

UNITED STATES PATENTS

| Number | Name | Date |
|---|---|---|
| 1,097,651 | Leeds | May 26, 1914 |
| 1,379,266 | Keeler | May 24, 1921 |
| 1,956,538 | Ridings et al. | Apr. 24, 1934 |
| 2,049,306 | Matson | July 28, 1936 |